United States Patent [19]

Bundt et al.

[11] Patent Number: 4,749,298

[45] Date of Patent: Jun. 7, 1988

[54] TEMPERATURE RESISTANT FASTENER ARRANGEMENT

[75] Inventors: Edgar Bundt, Cocoa Beach; Anthony M. Zimmerman, Palm Beach Gardens, both of Fla.

[73] Assignee: United Technologies Corporation, Hartford, Conn.

[21] Appl. No.: 44,092

[22] Filed: Apr. 30, 1987

[51] Int. Cl.⁴ ............................................. F16B 11/00
[52] U.S. Cl. ...................................... 403/23; 403/24; 403/34; 403/408.1; 165/134.1; 165/169; 411/403
[58] Field of Search ................... 403/34, 28, 24, 408.1, 403/23; 285/41; 165/80.1, 134.1, 169; 411/403

[56] References Cited

U.S. PATENT DOCUMENTS

| | | |
|---|---|---|
| 2,506,596 | 5/1950 | Howard ............................. 165/80.1 |
| 3,410,544 | 11/1968 | Beck ...................................... 165/169 |
| 4,069,102 | 1/1978 | Berringer et al. ................ 285/41 X |

Primary Examiner—Andrew V. Kundrat
Attorney, Agent, or Firm—Troxell K. Snyder

[57] ABSTRACT

A fastener (24) secures a thin sheet liner (16) to a supportive substrate (10) for protection against an adjacent high temperature environment (12). Cooling air (20) flows through a plurality of openings (34) and impinges (36) on the fastener (24). The fastener (24) is received within a dimple (32) in the liner (16) and includes an enlarged head portion (38).

7 Claims, 1 Drawing Sheet

TEMPERATURE RESISTANT FASTENER ARRANGEMENT

This invention was made with Government support under a contract awarded by the Department of the Air Force. The Government has certain rights in this invention.

FIELD OF THE INVENTION

The present invention relates to a fastener for securing two members, one of which is exposed to a relatively high temperature environment.

BACKGROUND

One scheme for protecting a structural member such as a substrate disposed adjacent a relatively high temperature environment such as the hot exhaust gas stream of a gas turbine engine flowing within an exhaust nozzle or conduit, is to provide a relatively thin sheet of material disposed between the hot environment and the substrate for forming a thermal shield therebetween.

Such sheets may further be protected by supplying a flow of cooling air between the sheet liner and the supporting substrate. The problem of securing the liner to the substrate involves providing a fastener arrangement which is able to itself resist the high temperature environment and is preferentially uncomplicated in design.

For gas turbine engine exhaust nozzles having movable flaps disposed adjacent to the high temperature exhaust gases, a protective liner disposed between, for example, the flap substrate and the hot gases must be releasable from within the gas flow path in order to provide for replacement of the liner as well as to allow access to the internal structure of the flap for servicing thereof. As such fasteners must be accessible from the hot gas side, means for protecting any exposed fastener surface or structure must be provided by any successful arrangement in order to avoid burnout or over temperature of the fastener. A protected fastener arrangement adds additional protecting structure which may be expensive and time-consuming to remove in order to release the protected fastener.

What is needed is a temperature resistant fastener arrangement which is easily releasable from the hot gas side and which does not require additional protective structure against the adjacent high temperature environment.

SUMMARY OF THE INVENTION

It is therefore an object of the present invention to provide a temperature resistant means for releasably securing a heat protective liner to an underlying substrate for providing a thermal shield between the substrate and an adjacent high temperature environment.

It is further an object of the present invention to provide cooling means, adjacent the securing means, for protecting the securing means from the high temperature environment.

It is further an object of the present invention to provide an arrangement of a thermally protective sheet liner and fastener therefor which is releasable from the underlying, protected substrate from the high temperature side of the liner.

It is still further an object of the present invention to provide gas impingement cooling against the exposed surface of the fastener sufficient to thermally protect the fastener without additional protective structure or the like.

According to the present invention, a supporting substrate is protected from an adjacent, high temperature environment, such as the hot exhaust gas of a gas turbine engine, by interposing a relatively thin sheet liner between the substrate and the hot gas. The liner is secured to the substrate by a fastener which passes through the liner and is cooperably and releasably engaged with the substrate. A flow of cooling gas, such as relatively cool air supplied from the gas turbine engine compressor, passes between the liner and substrate for preventing overheating of the sheet liner.

The fastener according to the present invention is releasable from the hot gas side of the liner and substrate assembly and is thus itself at least partially exposed to the hot gas environment. The present invention provides local cooling for the exposed fastener by supplying a flow of impingement cooling air from a supply volume beneath the liner through a plurality of openings disposed in the liner adjacent the exposed fastener.

According to the disclosed embodiment of the present invention, the individual fasteners are received within corresponding dimples or depressions in the hot gas facing surface of the sheet liner. These dimples also act as standoffs for maintaining a uniform spacing between the liner and substrate, and further include the above-mentioned cooling holes for directing the cooling air against the fastener.

The fastener further includes an enlarged head portion, substantially parallel with the hot gas facing sheet surface surrounding the dimple, for defining a toroidal chamber and annular louver vent in cooperation with the surface of the dimple. Cooling air, entering the toroidal volume through the sheet liner cooling holes, impinges against the underside of the fastener head portion and exits via the annular louver, thus cooling the exposed fastener locally without additional protective structure or other cooling means.

The fastener itself is of simple, one piece construction and, if threaded at the end opposite the head for cooperably engaging the substrate as in the disclosed embodiment, is easily installed and removed for releasing the protective liner for service, replacement, etc.

It is further a feature of the arrangement according to the present invention that the fastener impingement cooling air does not traverse a complicated or tortuous path, rather passing straightforwardly through a plurality of parallel routes into the toroidal volume and venting into the hot gas environment. The simplicity and multiplicity of the gas flow routes reduce the likelihood of the occurrence of a blockage and a resultant interrruption of the fastener cooling air flow, thus resulting in a simple, effective, temperature resistant arrangement for securing the protective sheet liner to the protected substrate.

Both these and other objects and advantages of the fastener arrangement according to the present invention will be apparent to those skilled in the art upon review of the following specification and the appended claims and drawing figures.

DETAILED DESCRIPTION OF THE PREFERRED EMBODIMENT.

Figure 1:
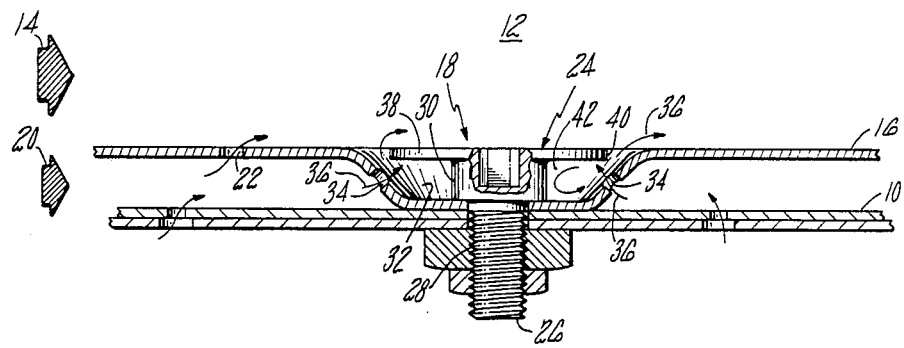
FIG. 1 shows a cross section of a liner, substrate, and fastener arrangement according to the present invention.

FIG. 1 shows a cross section through the fastener arrangement according to the present invention. A substrate 10 is disposed adjacent a high temperature environment 12 such as the exhaust gas flow stream 14 from a gas turbine engine (not shown), or the like.

The liner 10 is protected from the harsh environment 12 by a relatively thin sheet liner 16 disposed between the hot environment 12 and the substrate 10. The liner 16 is secured in a spaced apart relationship with the supporting substrate 10 by a securing means 18 which extends through the liner 16 and releasably engages the substrate 10.

The liner 16 is cooled by a flow of relatively cool gas 20 between the liner 16 and the substrate 10 which may be diverted from the compressor section of the gas turbine engine or any other suitable source. The liner cooling gas or air 20 cools the hot facing surface of the liner 16 by convective heat transfer due to impingement on the opposite underside of the liner 16, and/or by providing a transpiration film over the hot facing liner surface via transpiration openings 22 in the liner 16.

The securing means 18 includes a fastener 24 having a first engagement end 26 threadedly secured at 28 to the substrate 10. The fastener 24 includes an enlarged shoulder portion 30 which contacts the liner 16 and secures it against the substrate 10.

According to the preferred embodiment of the present invention, the fastener 24 is received within a dimple or depression 32 formed in the sheet liner 16. The dimple is of sufficient diameter to receive the entire fastener 24 therewithin and has a depth such that it additionally functions as a standoff for maintaining the desired spacing between the liner 16 and substrate 10. As is apparent to those skilled in the art, the fastener 24 and the surrounding portion of the liner 16 contacting the substrate 10 is subject to local overheating unless additional local cooling is provided. Such local cooling for the fastener 24 and surrounding liner 16 is achieved by a plurality of cooling openings 34 disposed in the dimple 32 of the liner 16 and oriented so as to discharge a flow of cooling air 36 from beneath the liner 16 against the portion of the fastener 24 extending into the hot environment 12. The impingement cooling air 36 provides the necessary additional local cooling capacity for protecting the fastener 24 against overheating due to contact with the hot gases 14 or due to radiation heat transfer from the hot environment 12.

Further protection of the dimpled portion 32 of the liner 16 is provided by an enlarged head 38 located at the other end of the fastener 24. The enlarged head 38 is substantially coplanar with the surrounding liner 16 and forms an annular louver 40 therewith. Impingement cooling air 36 flows from a toroidal volume 42 created by the enlarged head 38, shouldered portion 30 and dimpled liner 32 in the preferred embodiment, thus preventing the entry of the hot gas 14 and maintaining a cooling film over not only the adjacent liner 16 but the coplanar head 38.

It will further be appreciated by those skilled in the art that the enlarged, impingement cooled head 38 provides a radiation shield against that portion of the dimpled liner contacting the substrate 10 and hence not cooled by the air 20 flowing between the liner 16 and substrate 10.

Figure 2:
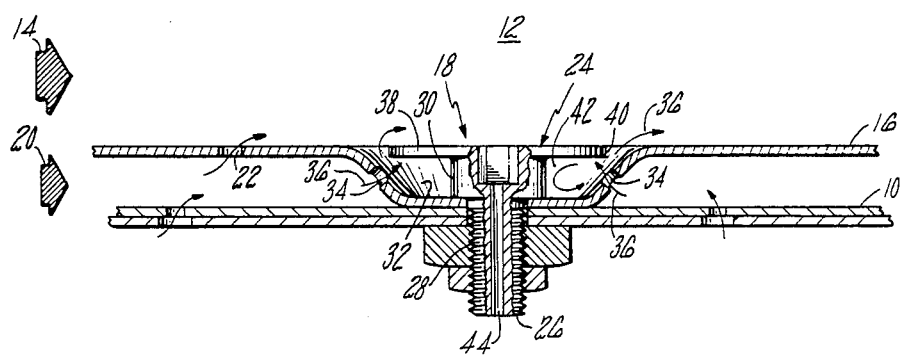
FIG. 2 shows an alternate embodiment of the arrangement according to the present invention configured for augmented fastener cooling.

FIG. 2 shows an alternative embodiment wherein the fastener 24 includes a linear, internal flow passage 44 for providing additional cooling at the hot facing surface of the head 38 and to the interior of the fastener 24. Such additional cooling capacity may be required to protect the securing means 18 under extremely severe high temperature conditions and may be added to an existing fastener 24, if required.

As will be appreciated by those skilled in the art, the securing arrangement 18 according to the present invention is well suited for releasably securing a sheet liner 16 to an underlying, supporting substrate 10. The fastener 24 according to the present invention is of simple, one piece construction and easily accessed from the hot side of the liner 16. Such access is especially advantageous in an aircraft application, such as in an exhaust nozzle for a gas turbine engine, wherein removal of the sheet liner 16 may be required for replacement thereof, for access to the underlying substrate structure 10, or for other maintenance or assembly needs.

The cooling air 36 directed against the fastener 24 is provided from the cool gas flow 20 present beneath the liner 16, thus avoiding any requirement for supplying additional cooling air routes to the liner fasteners. The airflow path 20, 36 is relatively uncomplicated, thus reducing the likelihood of any blockage forming in the openings 34 thereby restricting the flow of cooling air 36 into the toroidal volume 42. Likewise, the provision in the present invention for a plurality of cooling openings 34 for admitting impingement air 36 into said volume 42 provides a multiplicity of parallel cooling air flow paths for insuring at least a minimal quantity of cooling air.

As will further be appreciated by those skilled in the art, any one of a variety of engagement techniques for releasably attaching the fastener 24 to the substrate 10 may be used without departing from the scope of the present invention. In addition to the threaded end 26 as shown in FIGS. 1 and 2, such attachment may be made by a bayonet type arrangement, a stud affixed to the substrate 10 and cooperatively received within the enlarged shank 30, or by any of a variety of methods and structures well known in the art. It should further be appreciated that, although shown and discussed in terms of a circular dimple and fastener, the present invention may equivalently include non-circular depressions 32 and fastener heads 38 received therewithin.

As a result, the foregoing description and appended drawing figures should be considered as providing only a single illustrative definition of the securing arrangement according to the present invention and not as limiting the scope thereof beyond that recited in the following claims.

We claim:

1. A temperature resistant fastener arrangement comprising:
   a supporting substrate, disposed adjacent a flow of relatively hot gas;
   a protective sheet liner, disposed between the substrate and the hot gas flow, the liner being substantially uniformly spaced from the substrate and having one side thereof in contact with the hot gas;
   a fastener having a first portion extending through the liner, including a first end releasably secured to the substrate and a second end contacting the hot gas flow;

wherein the liner includes a plurality of openings, disposed adjacent the fastener for directing a flow of cooling gas from between the liner and substrate to impinge against the second end of the fastener.

2. The fastener arrangement as recited in claim 1, wherein the liner further includes:

a dimple disposed therein extending toward the substrate and in contact therewith, and wherein the shank portion of the fastener is located within the dimple and further includes an enlarged head portion at the second end thereof, the head extending laterally with respect to the shank and having a hot gas facing surface substantially flush with the liner surface surrounding the dimple.

3. The fastener arrangement as recited in claim 2, wherein the enlarged head and dimple form a toroidal volume therebetween disposed about the fastener shank portion, the volume including an annular vent opening into the hot gas flow and defined between the lateral edge of the fastener head and the liner.

4. The fastener arrangement as recited in claim 3, wherein the plurality of cooling openings are located in the dimple of the liner and direct the flow of cooling gas into the toroidal volume.

5. The fastener arrangement as recited in claim 4, wherein the first portion includes an enlarged shoulder disposed adjacent the fastener first end for cooperably engaging the liner and releasably securing the liner therewith to the substrate.

6. Means for securing a thermally protective thin sheet liner to an underlying substrate for protection against an adjacent high temperature environment, comprising:

a dimple, disposed in the high temperature environment facing side of the thin sheet liner and contacting the supportive substrate;

a fastener, disposed within the liner and releasably secured to the substrate, the fastener having at least a portion thereof exposed to the high temperature environment;

a plurality of cooling holes disposed in the dimple and oriented so as to direct a flow of cooling air from under the liner to impinge upon the exposed fastener portion.

7. The securing means as recited in claim 6, wherein the fastener further comprises:

an enlarged head having a flat surface facing the high temperature environment, the flat head surface being substantially coplanar with the surrounding high temperature environment facing surface of the sheet liner, the head and liner dimple further defining a toroidal volume for receiving the cooling air impinging against the fastener from the dimple cooling holes, and an annular louver outlet, in fluid communication with the toroidal volume, the louver opening into the high temperature environment for exhausting the impingement cooling gas therethrough.

* * * * *